US011858658B2

United States Patent
Bower et al.

(10) Patent No.: US 11,858,658 B2
(45) Date of Patent: Jan. 2, 2024

(54) APPARATUS FOR RESTRAINING AN AIRCRAFT

(71) Applicant: The Boeing Company, Chicago, IL (US)

(72) Inventors: Tim Bower, Chicago, IL (US); Donald R. Burns, Chicago, IL (US); Mellyssa Mulero, Chicago, IL (US); John P. Schnieders, Chicago, IL (US); Roger W. Bedell, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/687,356

(22) Filed: Mar. 4, 2022

(65) Prior Publication Data

US 2022/0396371 A1 Dec. 15, 2022

Related U.S. Application Data

(60) Provisional application No. 63/209,051, filed on Jun. 10, 2021.

(51) Int. Cl.
*B64F 1/04* (2006.01)

(52) U.S. Cl.
CPC ..................... *B64F 1/04* (2013.01)

(58) Field of Classification Search
CPC ................. B64F 1/04; B64F 1/06; B64F 1/16
See application file for complete search history.

(56) References Cited

U.S. PATENT DOCUMENTS

| | | | | |
|---|---|---|---|---|
| 3,813,065 A | * | 5/1974 | Hallesy | F15B 15/261 92/25 |
| 4,101,098 A | * | 7/1978 | Hickle | B64F 1/06 403/31 |
| 5,732,906 A | * | 3/1998 | Wong | B64C 25/50 244/63 |
| 2016/0207617 A1 | * | 7/2016 | Sada-Salinas | B64C 27/025 |
| 2017/0036656 A1 | * | 2/2017 | Stoops | B60T 13/141 |

FOREIGN PATENT DOCUMENTS

| | | | | |
|---|---|---|---|---|
| AU | 2014200597 A1 | * | 9/2014 | ............ B60L 9/00 |
| EP | 3009352 A1 | * | 4/2016 | ............ B64G 1/222 |

* cited by examiner

*Primary Examiner* — Tien Q Dinh
*Assistant Examiner* — Katherine June Bolek
(74) *Attorney, Agent, or Firm* — McDonnell Boehnen Hulbert & Berghoff LLP

(57) ABSTRACT

Examples include an apparatus for restraining an aircraft during engine acceleration, the apparatus including: a collet shaft that is configured to attach to the aircraft, a rod that is configured to attach to a runway, and a release mechanism that is configured to restrain the collet shaft to the release mechanism and configured to release the collet shaft in response to the release mechanism receiving an electric current.

20 Claims, 11 Drawing Sheets

US 11,858,658 B2

APPARATUS FOR RESTRAINING AN AIRCRAFT

CROSS REFERENCE TO RELATED APPLICATION

The present application is a non-provisional patent application claiming priority to U.S. Provisional Application No. 63/209,051, filed on Jun. 10, 2021, the contents of which are hereby incorporated by reference.

FIELD

The present disclosure generally relates to aircraft takeoff systems, and more specifically to an apparatus for restraining an aircraft during engine acceleration.

BACKGROUND

Some aircraft takeoff systems hold back an aircraft as its engines accelerate while other (e.g., catapult) systems actively accelerate the aircraft along the runway during takeoff. Many current systems for assisting or restraining an aircraft during takeoff might not provide desirable levels of control and might not be compatible with multiple aircraft platforms. Some systems are designed to release the aircraft from the runway once the engine has reached a particular thrust, and this release thrust is not easily changed. Other systems include pop-up holdback panels on the runway that have dimensions that are specifically matched to the landing gear dimensions of a particular aircraft platform. Thus, a need exists for an aircraft takeoff assist system that has increased control and is compatible with multiple aircraft platforms.

SUMMARY

One aspect of the disclosure is an apparatus for restraining an aircraft during engine acceleration. The apparatus includes a collet shaft that is configured to attach to the aircraft; a rod that is configured to attach to a runway; and a release mechanism that is configured to restrain the collet shaft to the release mechanism and configured to release the collet shaft in response to the release mechanism receiving an electric current.

Another aspect of the disclosure is a method for restraining an aircraft during engine acceleration. The method includes attaching a collet shaft of an apparatus to the aircraft; attaching a rod of the apparatus to a runway; and causing an electric current to flow through a release mechanism of the apparatus, thereby causing the release mechanism to release the collet shaft.

Another aspect of the disclosure is a method for restraining an aircraft during engine acceleration. The method includes accelerating an engine of the aircraft while the aircraft is restrained to a runway by an apparatus; and electrically actuating the apparatus, thereby causing the apparatus to release the aircraft from the runway.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Within examples, an apparatus for restraining an aircraft during engine acceleration includes a collet shaft that is configured to attach to the aircraft, a rod that is configured to attach to a runway, and a release mechanism that is configured to restrain the collet shaft to the release mechanism and configured to release the collet shaft in response to the release mechanism receiving an electric current.

Because the apparatus is actuated electrically, it can be controlled by a human via a remote control or a switch, for example. As such, the human can choose to have the apparatus release the aircraft when the engine of the aircraft has reached a speed or thrust which is desirable for a given combination of aircraft type, runway, or weather conditions, for example. That is, the engine speed or thrust at which the aircraft is released to accelerate along the runway can be varied based on the situation. Additionally, the apparatus is configured to hold back the aircraft by its nose landing gear only. Thus, the apparatus can be used to restrain any aircraft platform while accelerating its engines.

Disclosed examples will now be described more fully hereinafter with reference to the accompanying Drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

FIGS. 1-11 are diagrams of structures and functionality related to an apparatus 100.

Figure 1:
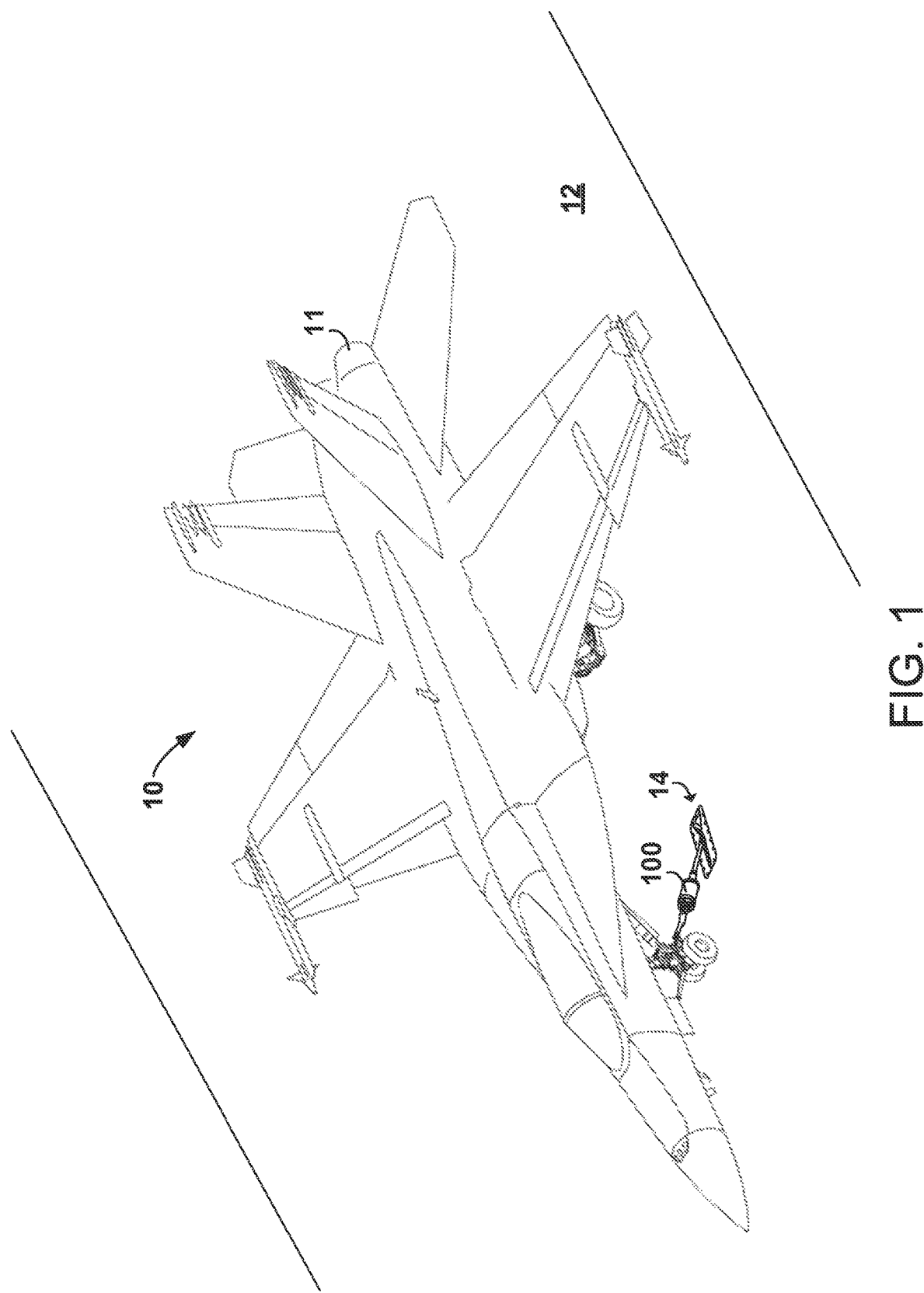
FIG. 1 is a schematic diagram of an apparatus restraining an aircraft to a runway, according to an example.

FIG. 1 is a perspective view of an aircraft 10 on a runway 12. In FIG. 1, the aircraft 10 is shown as a military (e.g., naval) aircraft, but the aircraft could also take the form of a commercial airliner, for example. The runway 12 can be an elongated paved surface on the surface of the Earth or a portion of a flight deck on an aircraft carrier, for example. Generally, the runway 12 can include any surface from which the aircraft 10 can takeoff after accelerating along the runway 12. The aircraft 10 includes at least one engine 11, such as an afterburning turbo fan. The apparatus 100 is restraining the aircraft 10 to the runway 12 via a clevis 14 mounted into a recess within the runway 12.

Figure 2:
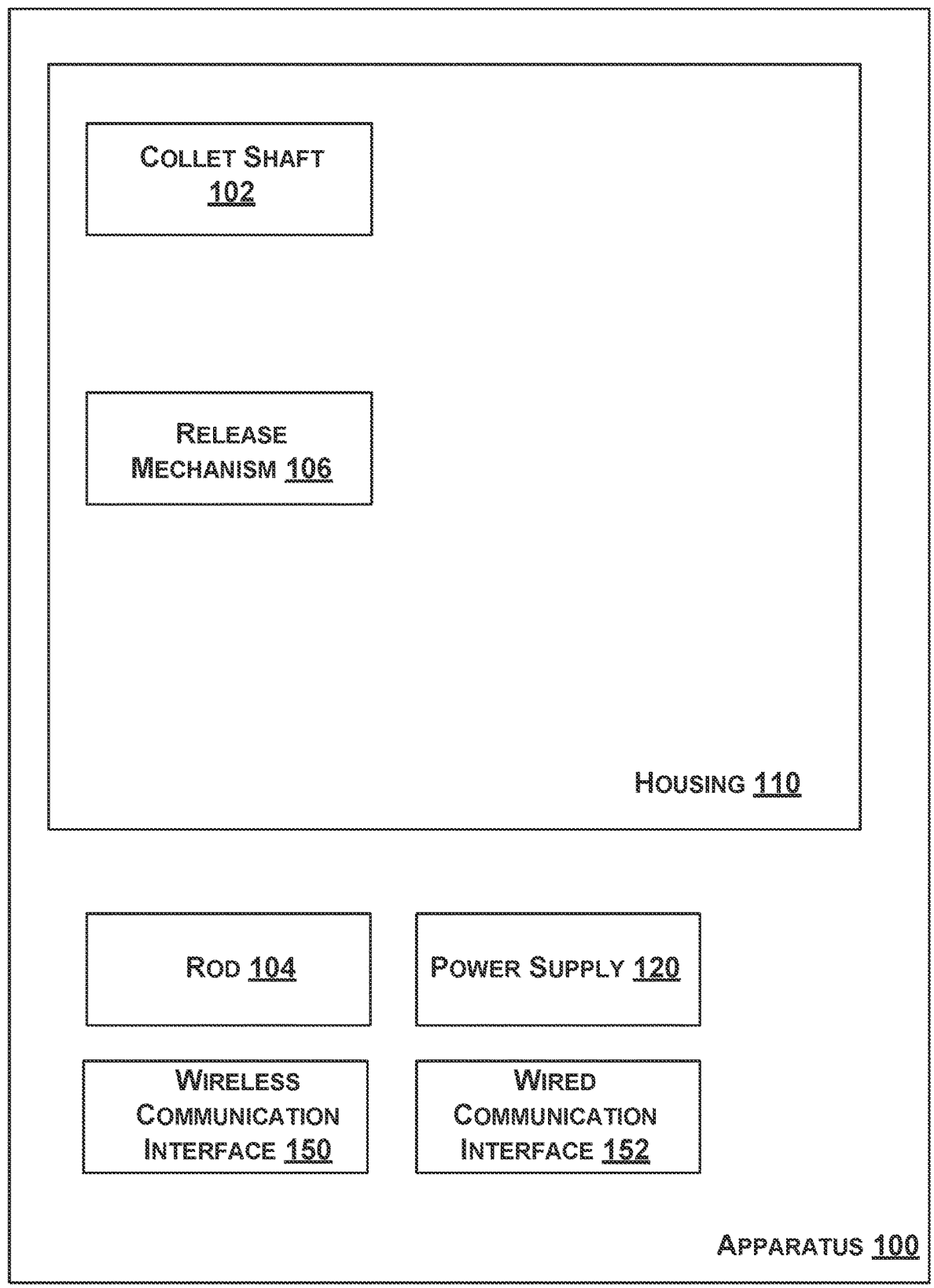
FIG. 2 is a block diagram of the apparatus of FIG. 1, according to an example.

FIG. 2 is a block diagram of the apparatus 100 for restraining the aircraft 10 during engine acceleration. The apparatus 100 includes a collet shaft 102 that is configured to attach to the aircraft 10, a rod 104 that is configured to attach to the runway 12, and a release mechanism 106 that is configured to restrain the collet shaft 102 to the release mechanism 106 and configured to release the collet shaft 102 in response to the release mechanism 106 receiving an electric current.

The apparatus 100 also includes a wireless communication interface 150. The wireless communication interface 150 includes hardware that enables the apparatus 100 to communicate with devices such as a remote control, a switch, and/or a power supply 120 of the apparatus 100. The hardware can include transmitters, receivers, and/or antennas. For example, the wireless communication interface 150 is configured to facilitate wireless data communication according to one or more wireless communication standards, such as one or more Institute of Electrical and Electronics Engineers (IEEE™) 801.11 standards, ZigBee™ standards, Bluetooth™ standards, etc.

The release mechanism 106 is configured to release the collet shaft 102 in response to the apparatus 100 receiving a command via the wireless communication interface 150. For example, a remote control can send a wireless signal that is received by the wireless communication interface 150. In response, the wireless communication interface 150 causes the power supply 120 to provide the electric current to the release mechanism 106, causing the release mechanism 106 to release the collet shaft 102.

The apparatus 100 also includes a wired communication interface 152 that enables the apparatus 100 to communicate with one or more devices such as a remote control, a switch, and/or the power supply 120. The release mechanism 106 is also configured to release the collet shaft 102 in response to receiving a command via the wired communication interface 152. For example, a wired remote control can send a signal that is received by the wired communication interface 152. In response, the wired communication interface 152 causes the power supply 120 to provide the electric current to the release mechanism 106, causing the release mechanism 106 to release the collet shaft 102.

The power supply 120 is configured to cause the release mechanism 106 to release the collet shaft 102 in response to enabling the power supply 120. For example, closing a switch can cause the power supply 120 to provide electric current to the release mechanism 106, destroying and/or thermally deforming a portion of the release mechanism 106 and causing the release mechanism 106 to release the collet shaft 102. This is shown in more detail in subsequent figures.

Figure 3:
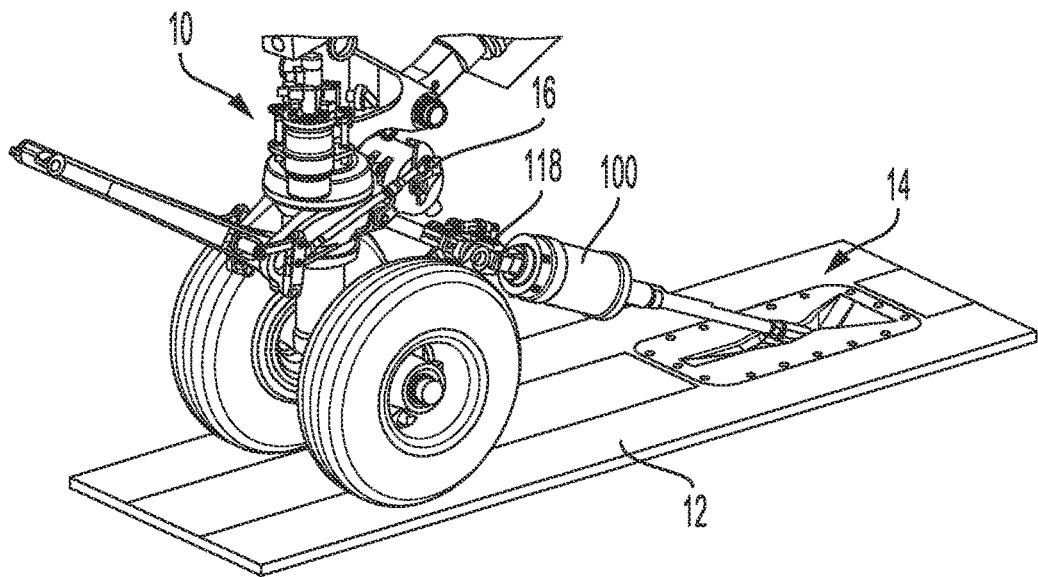
FIG. 3 is a perspective view of the apparatus of FIG. 1, the aircraft of FIG. 1, and the runway of FIG. 1, according to an example.

FIG. 3 is a perspective view of the apparatus 100, the aircraft 10, and the runway 12. The clevis 14 or another type of attachment component is mounted into a recess within the runway 12. In FIG. 3, the apparatus 100 is restraining the aircraft 10 at a nose landing gear 16 of the aircraft 10, via an attachment component 118. Thus, the engine(s) 11 of the aircraft 10 might be accelerating while the aircraft 10 is stationary, to ready the aircraft 10 for takeoff. The clevis 14 is configured to attach to a clevis pin 112 of the apparatus 100, which is described in more detail below. Additionally, the collet shaft 102 is attached to the aircraft 10 via attaching the collet shaft 102 to the nose landing gear 16, via the attachment component 118.

Figure 4:
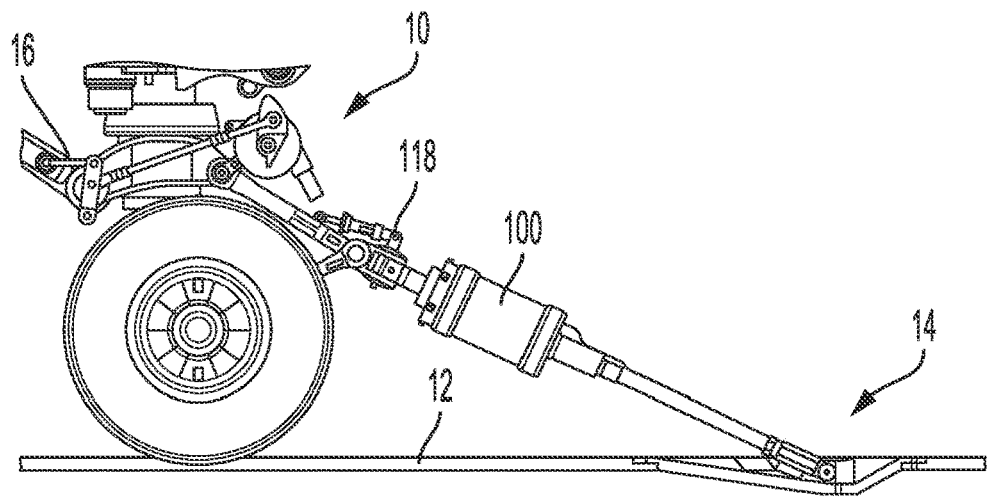
FIG. 4 is a side view of the apparatus, the aircraft, and the runway of FIG. 3, according to an example.

FIG. 4 is a side view of the apparatus 100, the aircraft 10, and the runway 12. Again, the apparatus 100 is restraining the aircraft 10 at the nose landing gear 16 of the aircraft 10.

Figure 5:
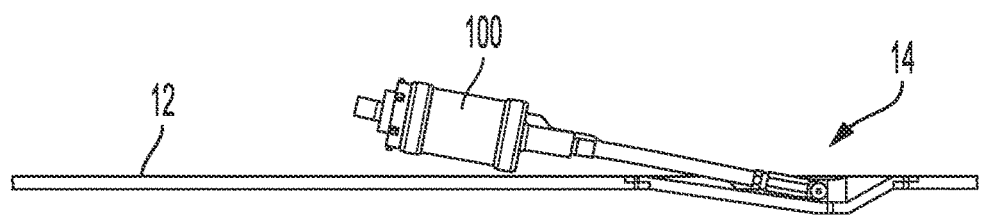
FIG. 5 is a side view of the apparatus and the runway of FIG. 4, according to an example.

FIG. 5 is a side view of the apparatus 100 and the runway 12. Here, the apparatus 100 has released the aircraft 10 and the aircraft 10 has performed takeoff. The apparatus 100 remains attached to the runway 12 via the attachment of the clevis pin 112 to the clevis 14.

Figure 6:
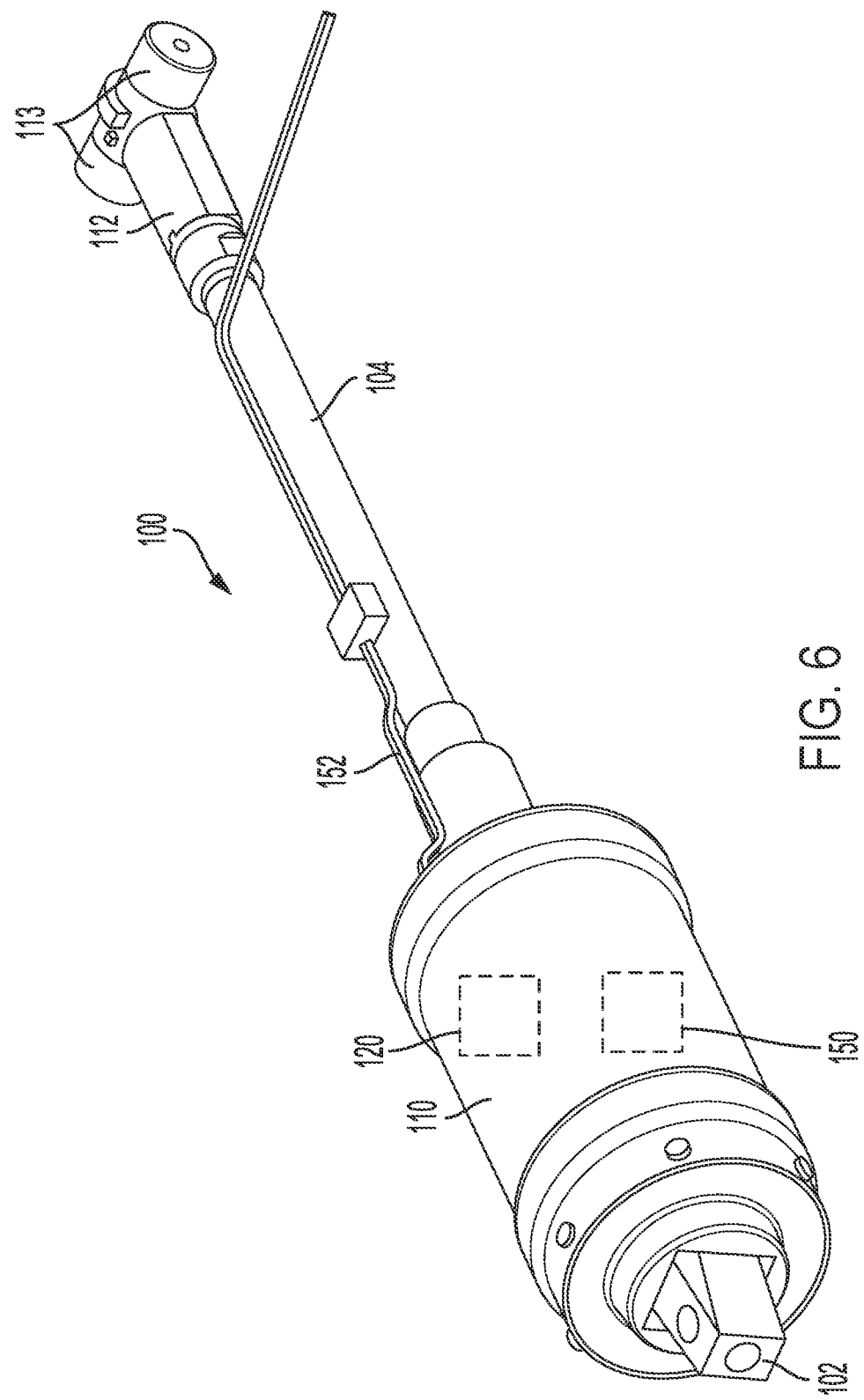
FIG. 6 is a perspective view of the apparatus of FIG. 5, according to an example.

FIG. 6 is a schematic perspective view of the apparatus 100. As shown, the collet shaft 102 extends from a housing 110 of the apparatus 100. The collet shaft 102 is generally a machined metal component that is shown in more detail in subsequent figures.

The rod 104 is also generally formed of metal and is attached to the housing 110. The rod 104 includes the clevis pin 112 that is configured to attach to the clevis 14 that is mounted to the runway 12. That is, the clevis pin 112 has protrusions 113 on opposite sides of the clevis pin 112 that extend away from a longitudinal axis of the rod 104. The rod 104 can attach to the runway 12 in other ways as well.

The release mechanism 106 is not shown in FIG. 6 because it is contained within the housing 110 along with a portion of the collet shaft 102. The housing 110 takes the form of a hollow metal can. FIG. 6 also shows a portion of the wired communication interface 152, and also the power supply 120 and the wireless communication interface 150 within the housing 110, as an example.

Figure 7:
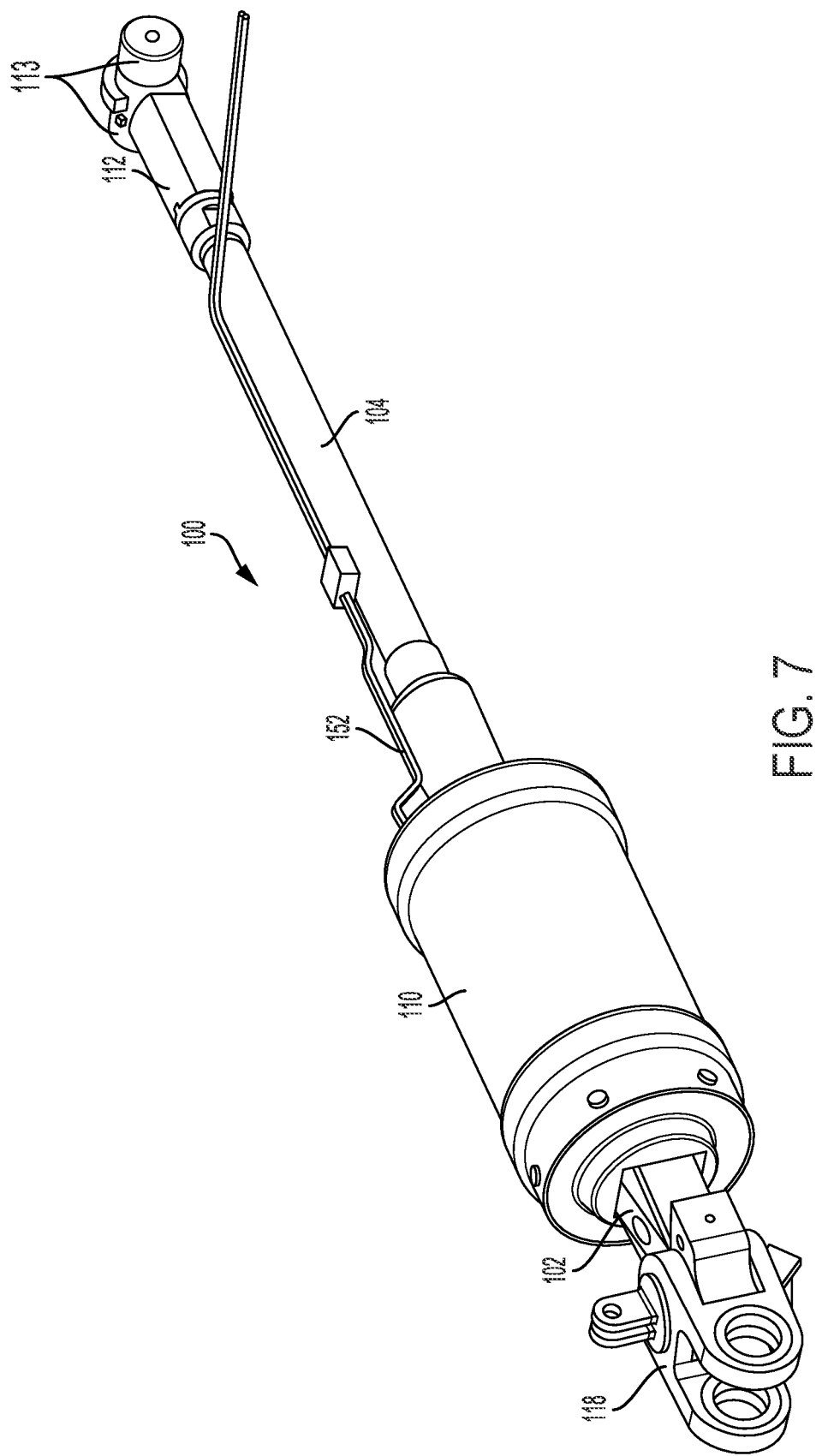
FIG. 7 is a perspective view of the apparatus of FIG. 6, according to an example.

FIG. 7 is also a schematic perspective view of the apparatus 100. However, FIG. 7 also shows the attachment component 118 of the aircraft 10 clasping the collet shaft 102. The attachment component 118 is configured for attachment to the nose landing gear 16 of the aircraft 10.

Figure 8:
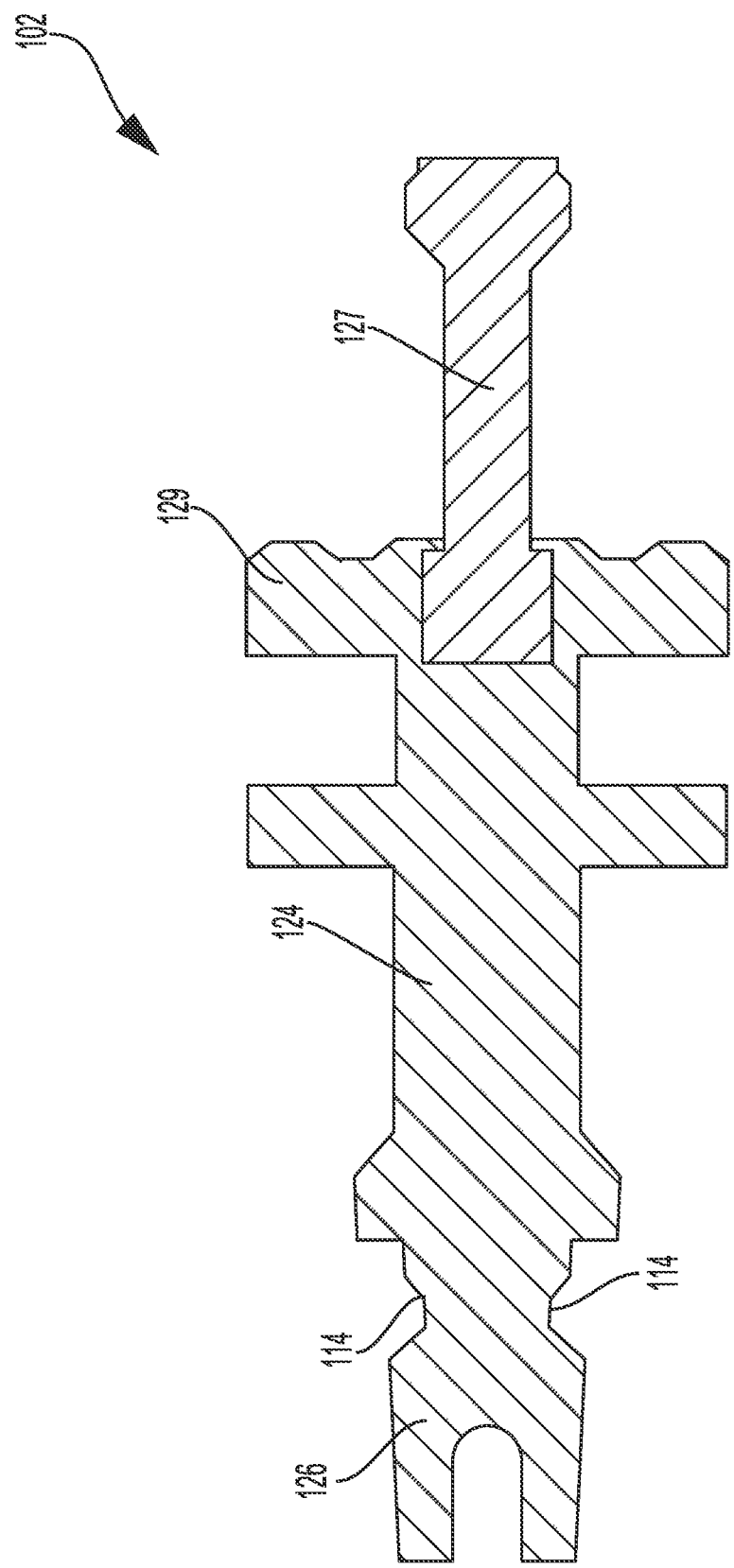
FIG. 8 is a cross section of the collet shaft of FIG. 7, according to an example.

FIG. 8 is a schematic cross section of the collet shaft 102. The collet shaft 102 includes a main body 124 and a release pin 127 attached (e.g., fastened, welded, etc.) to the main body 124. A first end 126 of the main body 124 is configured to attach to the aircraft 10 and a second end 129 of the main body 124 is attached to the release pin 127. In some examples, the release pin 127 and the main body 124 are a single integrated component. The collet shaft 102 (e.g., the main body 124) includes keyed receiving surfaces 114 that are described in more detail below.

Figure 9:
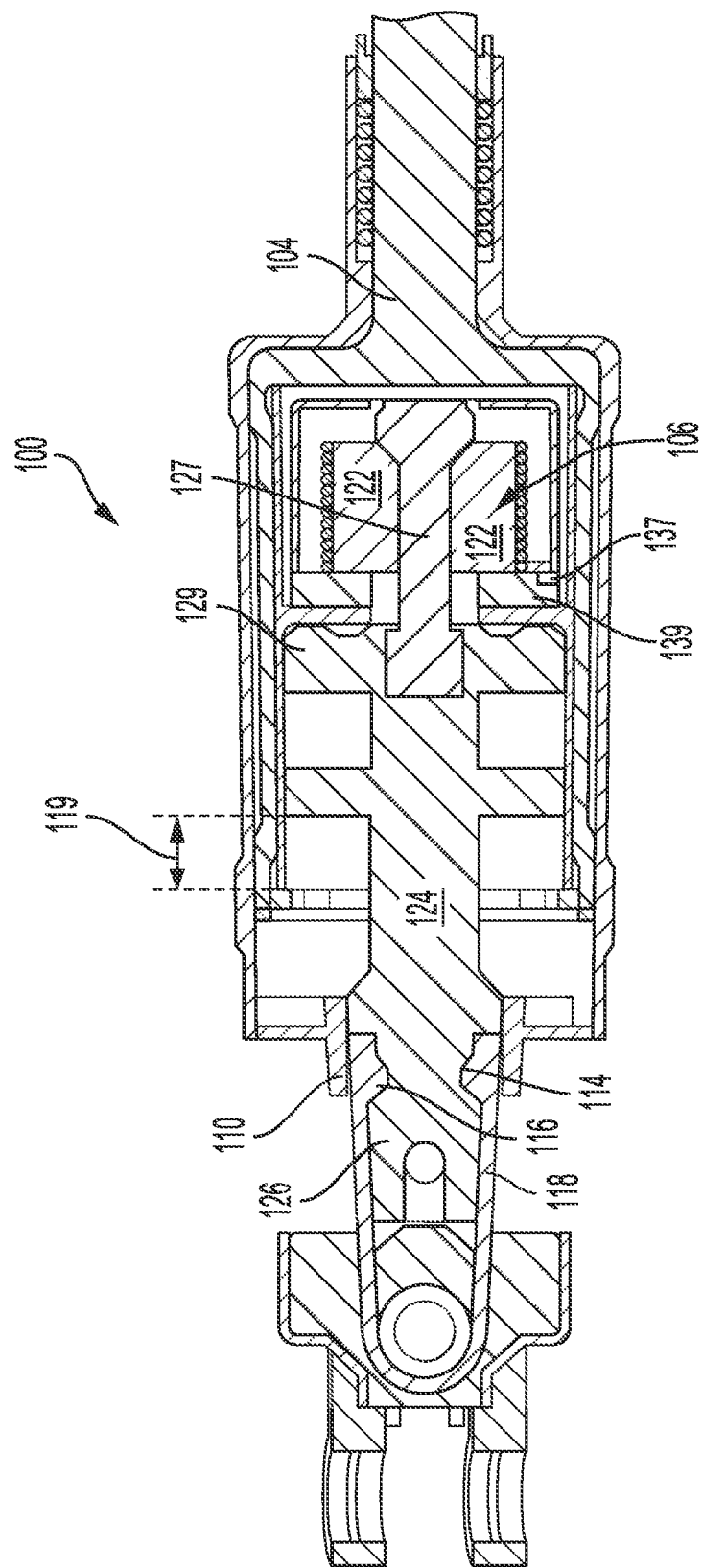
FIG. 9 is a cross section of the apparatus of FIG. 7, according to an example.

FIG. 9 is a schematic cross section of the apparatus 100. The attachment component 118 of the aircraft 10 clasps the first end 126 of the collet shaft 102 (i.e., the main body 124). More specifically, keyed hooks 116 of the attachment component 118 are inserted into the housing 110 such that the housing 110 holds the keyed hooks 116 against the keyed receiving surfaces 114 of the collet shaft 102 (i.e., the main body 124). The keyed receiving surfaces 114 of the collet shaft 102 engage with the keyed hooks 116 of the attachment component 118. When the release mechanism 106 releases the collet shaft 102, the collet shaft 102 moves leftward away from the rod 104 such that the attachment component 118 exits the housing 110 and disconnects from the collet shaft 102. That is, when the release mechanism 106 releases the collet shaft 102, the collet shaft 102 is free to move leftward a distance 119 away from the rod 104, being pulled by the aircraft 10. More specifically, the release mechanism 106 releases the release pin 127 to free the collet shaft 102 from the rod 104.

In some examples, a portion of the housing 110 is configured to retract toward the rod 104 upon release of the collet shaft 102 from the release mechanism 106, to assist with releasing the collet shaft 102.

Figure 10:
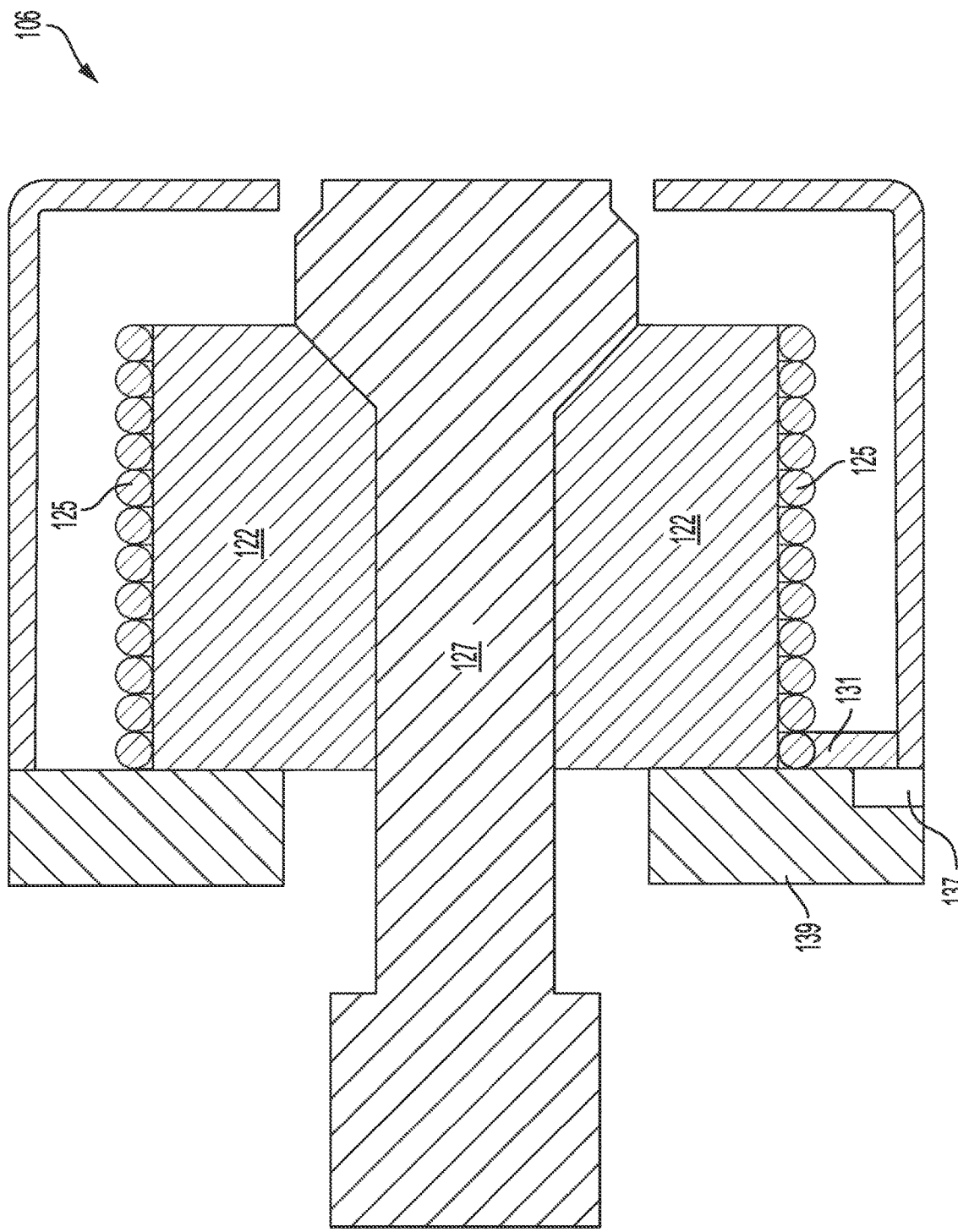
FIG. 10 is a close-up cross section of the apparatus of FIG. 9, according to an example.

FIG. 10 is a schematic cross section of the release pin 127 of the collet shaft 102 and the release mechanism 106. As shown, the release mechanism 106 includes a clamshell 122 configured to restrain the release pin 127 of the collet shaft 102. The clamshell 122 is metal or another material machined to have an inner surface that conforms to an outer surface of the release pin 127 of the collet shaft 102. A coil of wire 125 surrounds (e.g., is wrapped around) the clamshell 122 and compresses the clamshell 122 against the release pin 127 which is attached to the main body 124, thereby holding the main body 124 of the collet shaft 102 in place to hold the aircraft 10 to the runway 12.

A fuse wire 131 is mechanically coupled (e.g., welded or soldered) to the coil of wire 125 and is included as part of the release mechanism 106. An electrical terminal 137 electrically couples the fuse wire 131 to external wiring. Additionally, the fuse wire 131 mechanically anchors the coil of wire 125 to an electrically insulating portion of the electrical terminal 137 of the release mechanism 106 such that the coil of wire 125 cannot unfurl. The electrical terminal 137 is located within a base 139 of the release mechanism 106. The collet shaft 102 (i.e., the release pin 127) is released in response to the fuse wire 131 receiving a current that is powerful enough to melt or otherwise deform the fuse wire 131 such that the coil of wire 125 is no longer anchored to the electrical terminal 137 and no longer compresses the clamshell 122 against the release pin 127 of the collet shaft 102. As described above, the power supply 120 can provide the current (e.g., by enabling the power supply 120) in response to the wireless communication interface 150 or the wired communication interface 152 receiving a command to release the aircraft 10.

Figure 11:
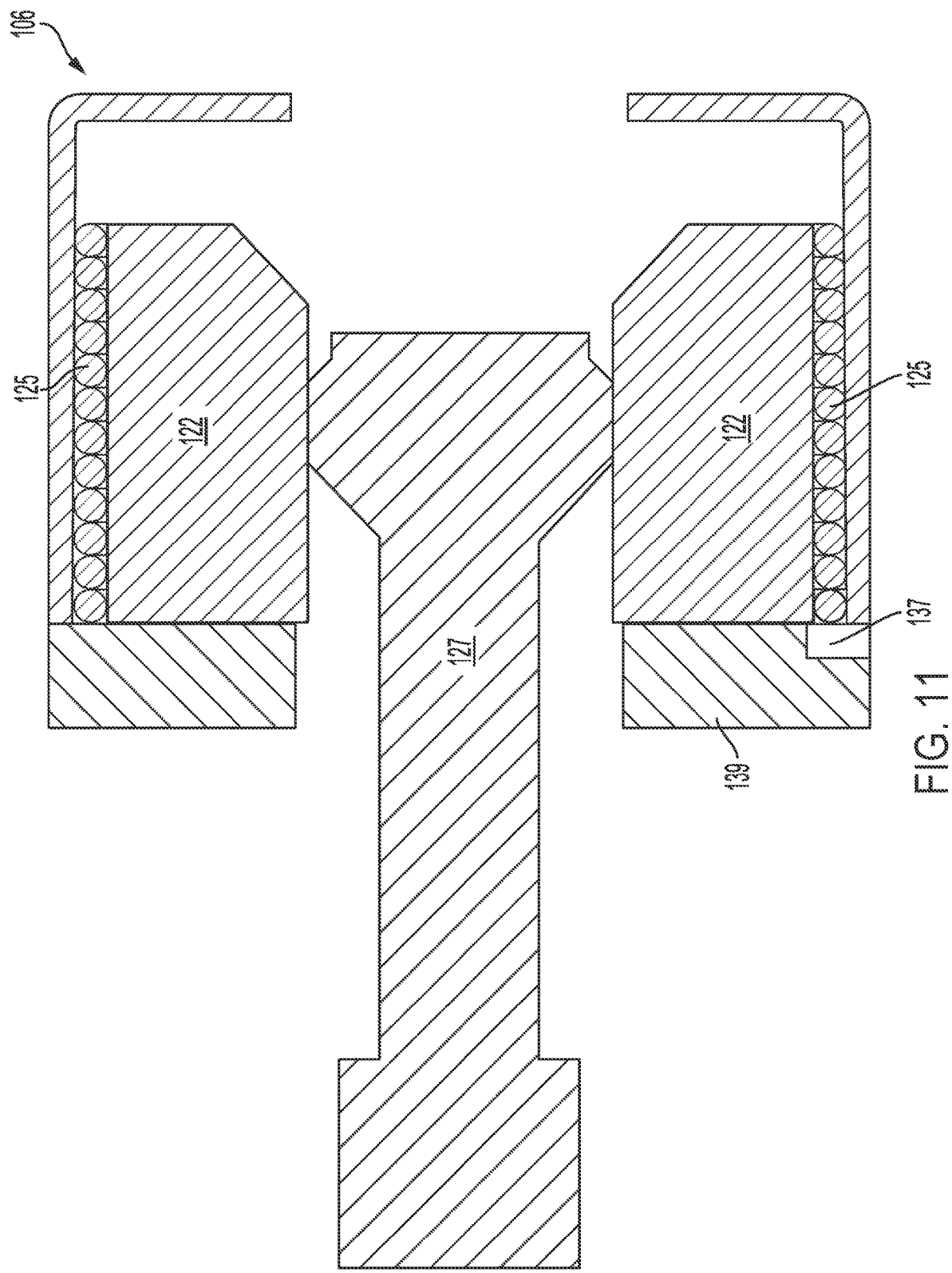
FIG. 11 is a close-up cross section of the apparatus of FIG. 9, according to an example.

FIG. 11 is a schematic cross section of the release pin 127 of the collet shaft 102 and the release mechanism 106. In FIG. 11, current has passed through the fuse wire 131, melting or otherwise deforming the fuse wire 131 such that the coil of wire 125 is no longer anchored to the electrical terminal 137 and no longer compresses the clamshell 122 against the release pin 127 of the collet shaft 102. As such, the release mechanism 106 (e.g., the clamshell 122) has released the collet shaft 102 and the aircraft 10 has pulled the release pin 127 and the collet shaft 102 via the first end 126 within the housing 110 away from the clamshell 122 and the rod 104 such that the attachment component 118 of the aircraft 10 can disengage the collet shaft 102.

Figure 12:
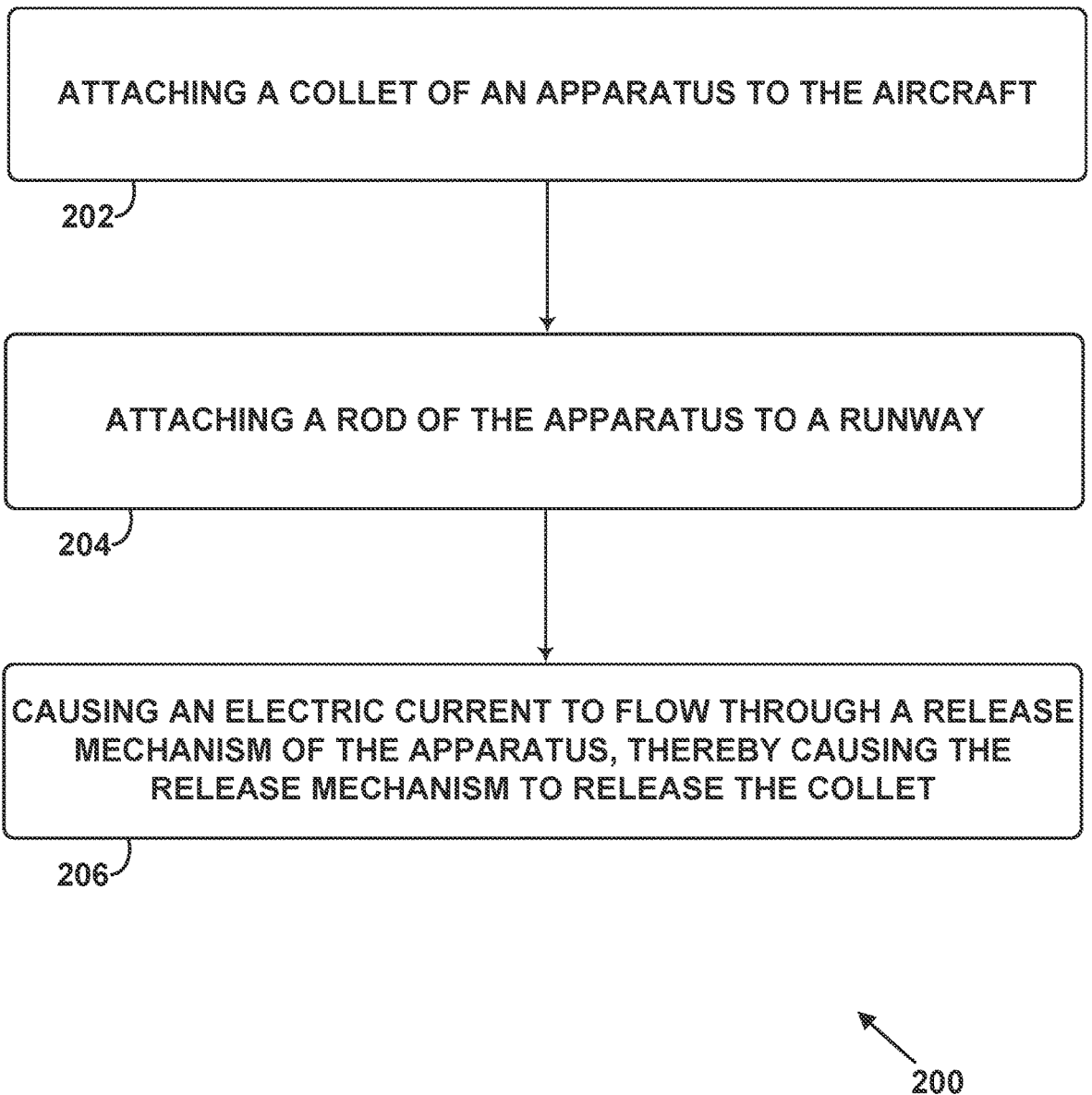
FIG. 12 is block diagram of a method for restraining the aircraft of FIG. 1, according to an example.
Figure 13:
FIG. 13 is block diagram of a method for restraining the aircraft of FIG. 1, according to an example.

FIG. 12 and FIG. 13 are block diagrams of a method 200 for restraining an aircraft during engine acceleration and a method 300 for restraining an aircraft during engine acceleration. As shown in FIG. 12 and FIG. 13, the method 200 and the method 300 include one or more operations, functions, or actions as illustrated by blocks 202, 204, 206, 302, and 304. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes attaching the collet shaft 102 of the apparatus 100 to the aircraft 10, as described above with reference to FIGS. 1-4 and FIGS. 7-11. Generally, a person will manually attach the collet shaft 102 to the aircraft 10, via the attachment component 118.

At block 204, the method 200 includes attaching the rod 104 of the apparatus 100 to the runway 12, as described above with reference to FIGS. 1-4. Generally, a person will manually attach the rod 104 to the runway 12, via the clevis 14 and the clevis pin 112.

At block 206, the method 200 includes causing the electric current to flow through the release mechanism 106 of the apparatus 100, thereby causing the release mechanism 106 to release the collet shaft 102, as described above with reference to FIGS. 9-11. Generally, a person will actuate a remote control or a switch and the apparatus 100 receives this command via the wireless communication interface 150 or the wired communication interface 152, and the apparatus 100 responsively enables the power supply 120 to provide the electric current to the release mechanism 106.

At block 302, the method 300 includes accelerating the engine 11 of the aircraft 10 while the aircraft 10 is restrained to the runway 12 by the apparatus 100, as described above with reference to FIG. 1 and FIG. 3. Typically, a pilot of the aircraft 10 will use cockpit controls to accelerate the engine 11.

At block 304, the method 300 includes electrically actuating the apparatus, thereby causing the apparatus to release the aircraft from the runway, as described above with reference to FIG. 5 and FIGS. 9-11. Generally, a person (e.g., the pilot or another person) will actuate a remote control or a switch and the apparatus 100 receives this command via the wireless communication interface 150 or the wired communication interface 152, and the apparatus 100 responsively enables the power supply 120 to provide the electric current to the release mechanism 106.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus for restraining an aircraft during engine acceleration, the apparatus comprising:
  a collet shaft that is configured to attach to the aircraft;
  a rod that is configured to attach to a runway; and
  a release mechanism comprising:
    an electrical terminal;
    a clamshell;
    a fuse wire; and
    a coil of wire disposed around the clamshell and anchored to the electrical terminal by the fuse wire, wherein the clamshell is configured to restrain the collet shaft and configured to release the collet shaft in response to an electric current flowing through the fuse wire and thermally deforming the fuse wire.

2. The apparatus of claim 1, wherein the collet shaft is free to move away from the rod upon release of the collet shaft from the release mechanism.

3. The apparatus of claim 1, further comprising a housing, wherein the collet shaft is configured to move away from the rod within the housing upon release of the collet shaft from the release mechanism.

4. The apparatus of claim 1, wherein the rod comprises a clevis pin configured to attach to a clevis that is mounted to the runway.

5. The apparatus of claim 1, wherein the collet shaft comprises keyed receiving surfaces configured to engage with keyed hooks of an attachment component of the aircraft.

6. The apparatus of claim 5, the apparatus further comprising a housing configured to receive the keyed hooks and hold the keyed hooks against the keyed receiving surfaces.

7. The apparatus of claim 1, further comprising a housing configured to contain the release mechanism and the collet shaft.

8. The apparatus of claim 1, further comprising a wireless communication interface, wherein the release mechanism is configured to release the collet shaft in response to receiving a command via the wireless communication interface.

9. The apparatus of claim 1, further comprising a wired communication interface, wherein the release mechanism is configured to release the collet shaft in response to receiving a command via the wired communication interface.

10. The apparatus of claim 1, further comprising a power supply, wherein the power supply is configured to cause the release mechanism to release the collet shaft in response to enabling the power supply.

11. The apparatus of claim 1, the collet shaft comprising a main body and a release pin attached to the main body, wherein the clamshell is configured to restrain the release pin, and wherein a first end of the main body is configured to attach to the aircraft and a second end of the main body is attached to the release pin.

12. A method for restraining an aircraft during engine acceleration, the method comprising:
    attaching a collet shaft of an apparatus to the aircraft;
    attaching a rod of the apparatus to a runway; and
    causing an electric current to flow through a fuse wire of the apparatus, thereby thermally deforming the fuse wire, releasing from an electrical terminal of the apparatus a coil of wire that is disposed around a clamshell, and causing the clamshell to release the collet shaft.

13. The method of claim 12, wherein causing the clamshell to release the collet shaft comprises causing the collet shaft to move away from the rod such that an attachment component of the aircraft exits a housing of the apparatus and disconnects from the collet shaft.

14. The method of claim 12, wherein causing the electric current to flow through the fuse wire comprises causing the electric current to flow through the fuse wire in response to a wired communication interface or a wireless communication interface of the apparatus receiving a command to release the aircraft.

15. The method of claim 12, wherein causing the clamshell to release the collet shaft comprises causing the clamshell to release a release pin of the collet shaft while a main body of the collet shaft is attached to the aircraft and attached to the release pin.

16. The method of claim 12, further comprising:
    accelerating an engine of the aircraft while the aircraft is restrained to the runway by the apparatus.

17. The method of claim 16, wherein accelerating the engine comprises accelerating the engine before causing the electric current to flow through the fuse wire.

18. The method of claim 16, wherein causing the clamshell to release the collet shaft comprises releasing the collet shaft such that an attachment component of the aircraft exits a housing of the apparatus and disconnects from the collet shaft.

19. The method of claim 16, wherein causing the electric current to flow through the fuse wire comprises causing the electric current to flow through the fuse wire in response to a wired communication interface or a wireless communication interface of the apparatus receiving a command to release the aircraft.

20. An apparatus for restraining an aircraft during engine acceleration, the apparatus comprising:
    a collet shaft that is configured to attach to the aircraft;
    a rod that is configured to attach to a runway; and
    a release mechanism that is configured to restrain the collet shaft to the release mechanism and configured to release the collet shaft in response to the release mechanism receiving an electric current,
    the collet shaft comprising a main body and a release pin attached to the main body, wherein the release mechanism comprises a clamshell configured to restrain the release pin, and wherein a first end of the main body is configured to attach to the aircraft and a second end of the main body is attached to the release pin,
    wherein the release mechanism further comprises:
    a coil of wire around the clamshell;
    an electrical terminal; and
    a fuse wire that anchors the coil of wire to the electrical terminal, wherein the clamshell is configured to release the collet shaft in response to the electric current deforming the fuse wire.

\* \* \* \* \*